US011353374B2

(12) United States Patent
Heo et al.

(10) Patent No.: US 11,353,374 B2
(45) Date of Patent: Jun. 7, 2022

(54) LIQUID LEAK DETECTION SENSOR HAVING SENSITIVITY ADJUSTABLE FUNCTION

(71) Applicants: AUTOSENSORKOREA CO., LTD., Suwon-si (KR); Ji Hyeon Heo, Suwon-si (KR); Sang Hyun Choi, Suwon-si (KR)

(72) Inventors: Ji Hyeon Heo, Suwon-si (KR); Sang Hyun Choi, Suwonsi (KR)

(73) Assignees: Ji Hyeon Heo, Suwon-si (KR); Sang Hyun Choi, Suwon-si (KR); AUTOSENSORKOREA CO., LTD., Suwon-si (KR)

( * ) Notice: Subject to any disclaimer, the term of this patent is extended or adjusted under 35 U.S.C. 154(b) by 246 days.

(21) Appl. No.: 16/633,363

(22) PCT Filed: May 18, 2018

(86) PCT No.: PCT/KR2018/005689
§ 371 (c)(1),
(2) Date: Jan. 23, 2020

(87) PCT Pub. No.: WO2019/135452
PCT Pub. Date: Jul. 11, 2019

(65) Prior Publication Data
US 2021/0033486 A1 Feb. 4, 2021

(30) Foreign Application Priority Data

Jan. 3, 2018 (KR) .................. 10-2018-0000886

(51) Int. Cl.
*G01M 3/38* (2006.01)
*G01D 11/24* (2006.01)

(52) U.S. Cl.
CPC .............. *G01M 3/38* (2013.01); *G01D 11/245* (2013.01)

(58) Field of Classification Search
CPC .............................. G01M 3/38; G01D 11/245
See application file for complete search history.

(56) References Cited

U.S. PATENT DOCUMENTS 5,667,332 A * 9/1997 Lindholm ............... F16B 21/18
403/326

FOREIGN PATENT DOCUMENTS

JP  2002-116138 A   4/2002
JP  2005-140634 A   6/2005
(Continued)

*Primary Examiner* — Jamel E Williams
(74) *Attorney, Agent, or Firm* — Novick, Kim & Lee, PLLC; Jae Youn Kim

(57) ABSTRACT

A liquid leak detection sensor has a sensitivity adjustable function, which adjusts a time to sense, that is, the sensitivity of a sensor regardless of whether the viscosity of a leaked liquid is high or low since a sensing position of the sensor can be adjusted according to the viscosity of the leaked liquid and the tilt of an installation place. The sensor includes a fixing connection fixture having a fixing plate with a fixing hole and a connection part formed with an angle adjustment protrusion, which are integrally provided; an insertion connection fixture into which the angle adjustment protrusion of the fixing connection fixture is inserted; a housing coupled to the insertion connection fixture and a substrate inserted into the housing and having a light-receiving unit for receiving light and a light-emitting unit for emitting light; and a lens part installed in the housing.

4 Claims, 7 Drawing Sheets

(56) References Cited

FOREIGN PATENT DOCUMENTS

| | | |
|---|---|---|
| JP | 2010-060422 A | 3/2010 |
| KR | 200448084 Y1 | 4/2010 |
| KR | 10-2013-0071974 A | 7/2013 |
| WO | 2017/022556 A1 | 2/2017 |

* cited by examiner

LIQUID LEAK DETECTION SENSOR HAVING SENSITIVITY ADJUSTABLE FUNCTION

TECHNICAL FIELD

The present invention relates to a liquid leak detection sensor having a sensitivity adjustable function and, more particularly, to a liquid leak detection sensor having a sensitivity adjustable function, the sensor having the convenience of enabling the presence/absence of a leak to be simply and conveniently measured since a change between the intensity of light emitted by a light-emitting unit and the intensity of light received by a leaked liquid can be detected; and enabling a time to sense, that is, the sensitivity of a sensor to be adjusted regardless of whether the viscosity of a leaked liquid is high or low since a sensing position of the sensor can be adjusted according to the viscosity of the leaked liquid, the tilt of an installation place, and the like.

BACKGROUND TECHNOLOGY

In general, various types of leak sensors are used to perform water leak detection and oil leak detection or the leakage in the case of leakage such as water leaks and oil leaks. Representative examples include cable type leak sensors, band type leak sensors, and modular leak sensors.

The cable type leak sensor is a leak detection sensor that detects the exposure of different liquids (water, oil, etc.) to accurately and quickly inform of the leak point of the liquid. The water leak detection and oil leak detection can be performed by detecting the occurrence of the potential difference in current flowing along the wire caused by the resistance of the water or oil leaked, whereby it is possible to confirm the water leakage and the oil leakage.

However, such a cable type leak sensor is expensive to install, and the length of the sensor cable is fixed, thereby customers have a limited choice. In addition, a separate bracket must be used when the sensor is installed, there are problems that it is difficult to install the sensor and additional cost is consumed. In addition, there are problems that it takes a long time to remove the property after the detection of the property and the connection to an external device is difficult.

Meanwhile, in the bend type leak detection sensor, when the water touches the wire while the current flows through the wire, the resistance value is changed so that it is possible to detect whether or not leak according to the change in the resistance value.

The bend type leak detection sensor can detect a large area of water leakage at a low cost, and is easy to install. However, there are problems that error rate is high due to high humidity or external shock, and accurate leakage location cannot be easily confirmed. In addition, and the product installation is coarse because there is no connection of installation.

In addition, there are problems that the price is expensive compared to the performance and the installation is difficult because it is necessary to separately install a bracket for allowing the sensor to be fixed to the floor at the time of installing. In addition, there is a problem that there is no connection method other than a simple relay contacting method at the time of connecting to external devices.

The modular leak sensor is configured so that to a photo sensor (light-receiving unit, light-emitting unit) is positioned within the plastic case. Herein, the beam of the light-emitting unit is received by the light-receiving unit in the state where the liquid is not detected, whereas the beam does not go to the light-receiving part due to the change of the refractive index when the liquid is detected by the beam of the light-emitting part, whereby water leak detection is performed in the state where the light is received.

Such a modular leak sensor can detect the leakage risk portion at low cost, installation is easy, and independent alarm is allowed irrespective of the surrounding device, and error due to humidity is not generated. However, unlike the cable type, there are problems that only a specific location of the leakage can be checked, and the connection with a peripheral device is difficult.

In addition, there is a problem that it takes a lot of time to install the product because a separate sensor fixing method must be planned. Since only one specific part of the hazardous area can be detected regardless of the viscosity of the leaked liquid and the slope of the ground, there is a problem that the sensing time is measured differently depending on the ground condition where the sensor is installed or the viscosity of the leaked liquid.

DISCLOSURE

Technical Problem

Accordingly, the present invention has been made keeping in mind the above problems occurring in the prior art, and an objective of the present invention is to provide a liquid leak detection sensor having a sensitivity adjustable function, the sensor having the convenience of enabling the sensitivity of a sensor, that is, a time to sense in the case of leakage to be adjusted since the sensor is easily installed regardless of the viscosity of the leaked liquid and the slope of the ground and the position of the sensor is adjusted according to the state of the ground or the viscosity of the leaked liquid.

Technical Solution

In order to achieve the above object, the present invention provides a liquid leak detection sensor using a sensitivity adjustable function, the sensor including a fixing connection fixture having a fixing plate with a fixing hole and a connection part formed with an angle adjustment protrusion, which are integrally provided; an insertion connection fixture into which the angle adjustment protrusion of the fixing connection fixture is inserted; a housing coupled to the insertion connection fixture and a substrate inserted into the housing and having a light-receiving unit for receiving light and a light-emitting unit for emitting light; and a lens part installed in the housing.

The angle adjustment protrusion may be protruded on an inner circumferential surface of a through hole of the connection part, in which two or more angle adjustment protrusions are formed at a regular interval.

A locking groove may be formed on an inner circumferential surface of a through hole of the connection part so that a locking protrusion of the insertion connection fixture inserted into the through hole is fitted into the locking groove to prevent separation from each other.

Advantageous Effects

According to the present invention, there is an advantage that the sensor has the convenience of enabling the presence/absence of a leak to be simply and conveniently measured since a change between the intensity of light emitted by a light-emitting unit and the intensity of light received by a leaked liquid can be detected; and the convenience of enabling a time to sense, that is, the sensitivity of a sensor to be adjusted regardless of whether the viscosity of a leaked liquid is high or low since a sensing position of the sensor can be adjusted according to the viscosity of the leaked liquid, the tilt of an installation place, and the like.

MODE FOR INVENTION

Figure 1A:
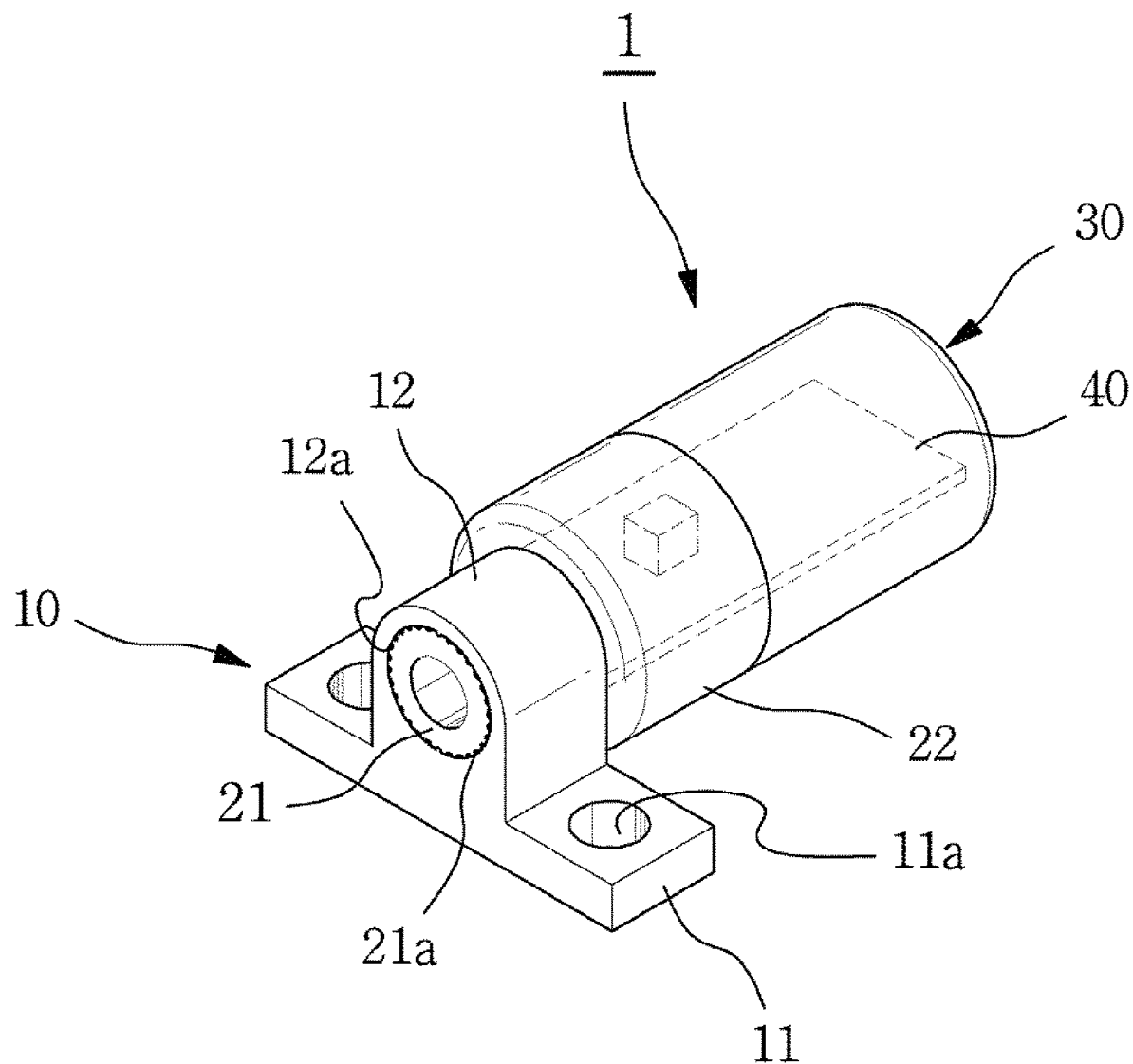
FIG. 1a is a perspective view showing the appearance of a liquid leak detection sensor having a sensitivity adjustable function to which the technology of the present invention is applied.
Figure 1B:
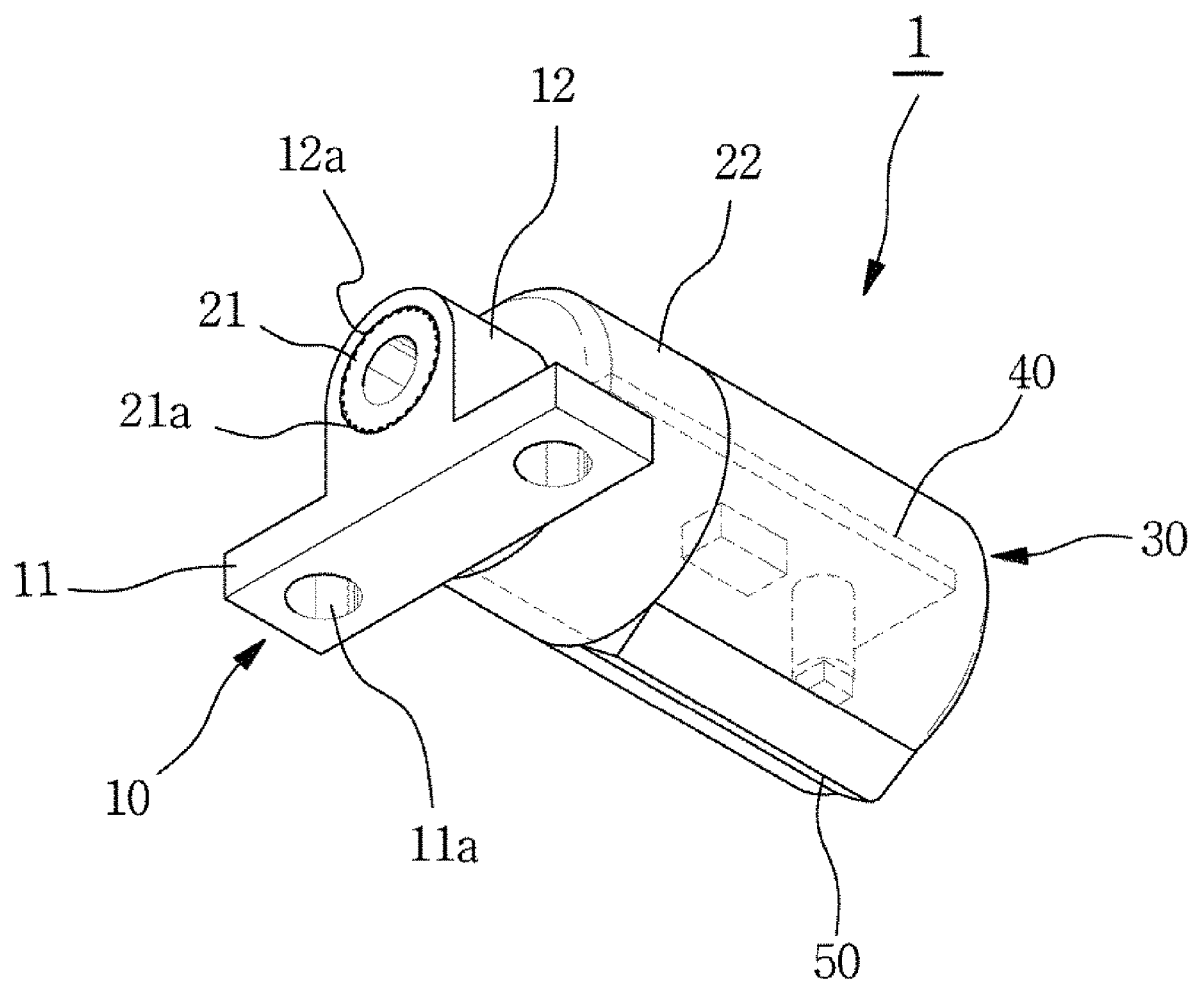
FIG. 1b is a rear perspective view showing the appearance of a liquid leak detection sensor having a sensitivity adjustable function to which the technology of the present invention is applied.
Figure 2:
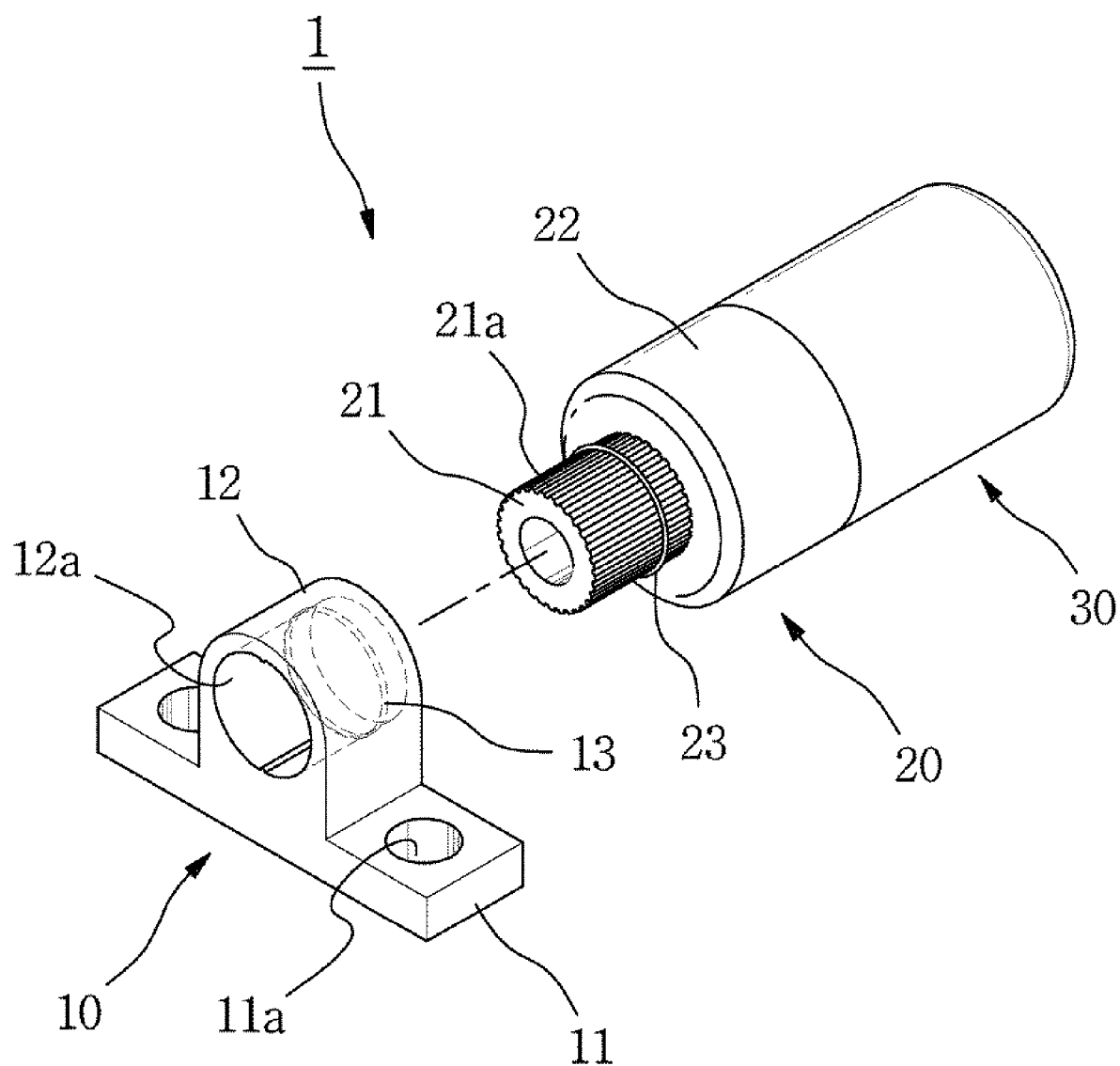
FIG. 2 is an exploded perspective view showing the structure of a liquid leak detection sensor having a sensitivity adjustable function to which the technique of the present invention is applied.

Preferred embodiments are described in detail on the basis of the accompanying drawings as follows. FIGS. 1a and 1b are a perspective view and a rear perspective view showing the appearance of a liquid leak detection sensor having a sensitivity adjustable function to which the technique of the present invention is applied, respectively; and FIG. 2 is an exploded perspective view showing the structure of a liquid leak detection sensor having a sensitivity adjustable function to which the technique of the present invention is applied. Referring to FIGS. 1a to 2, a liquid leak detection sensor 1 having a sensitivity adjustable function according to the present invention is configured to include a fixing connection fixture 10 configured so that a connection part 12 formed with an angle adjustment protrusion 12a is integrally formed with a fixing plate 11 having a fixing hole 11a, an insertion connection fixture 20 into which the angle adjustment protrusion 12a of the fixed connector 10 is inserted, a housing 30 coupled to the insertion connection fixture 20, a substrate 40 inserted into the housing 30 and having a light-receiving part for receiving light and a light-emitting part for emitting light, and a lens part 50 installed in the housing.

Figure 3:
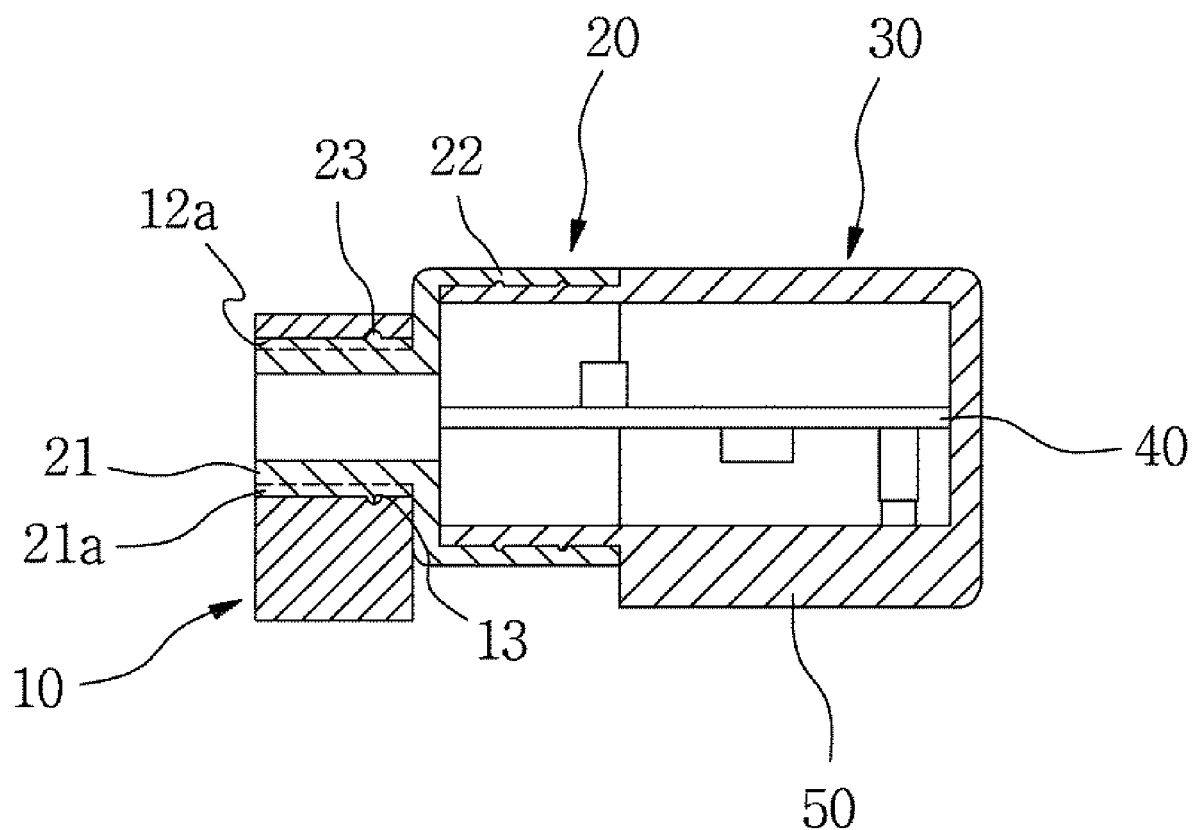
FIG. 3 is a cross-sectional view showing the structure of a liquid leak detection sensor having a sensitivity adjustable function to which the technique of the present invention is applied.

As shown in FIGS. 2 and 3, the angle adjustment protrusion 12a forms a through hole in the connection part 12 and is protruded on the inner circumferential surface of the through hole. Preferably, two angle adjustment protrusions 12a are configured to face to each other in 180 degree direction. The insertion connection fixture 20 is fitted into the through hole of the connection part 12 and is configured so that the cover coupled to the housing 30 is integral with an insertion part 21 having an angle adjusting part 21a having continuous peaks and valleys formed on the outer peripheral surface thereof.

Meanwhile, a locking groove 13 is formed on an inner circumferential surface of the through hole of the connection part 12, so that a locking protrusion 23 of the insertion connection fixture 20, which is inserted into the through hole, is fitted into the locking groove 13 to prevent separation from each other.

Figure 4A:
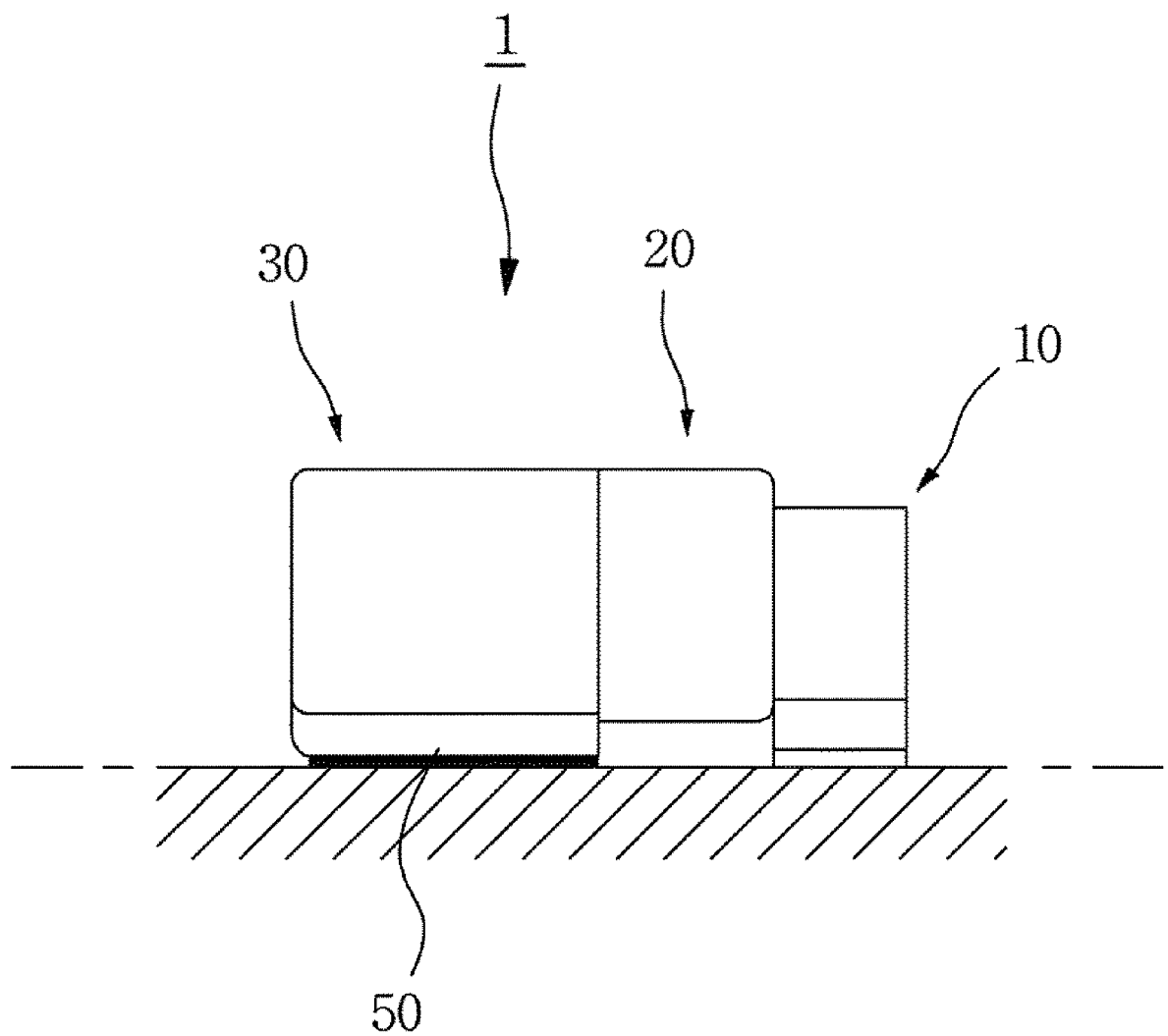
FIGS. 4a and 4b are installation state views showing the installation location of the liquid leak detection sensor having a sensitivity adjustable function to which the technique of the present invention is applied.
Figure 4B:
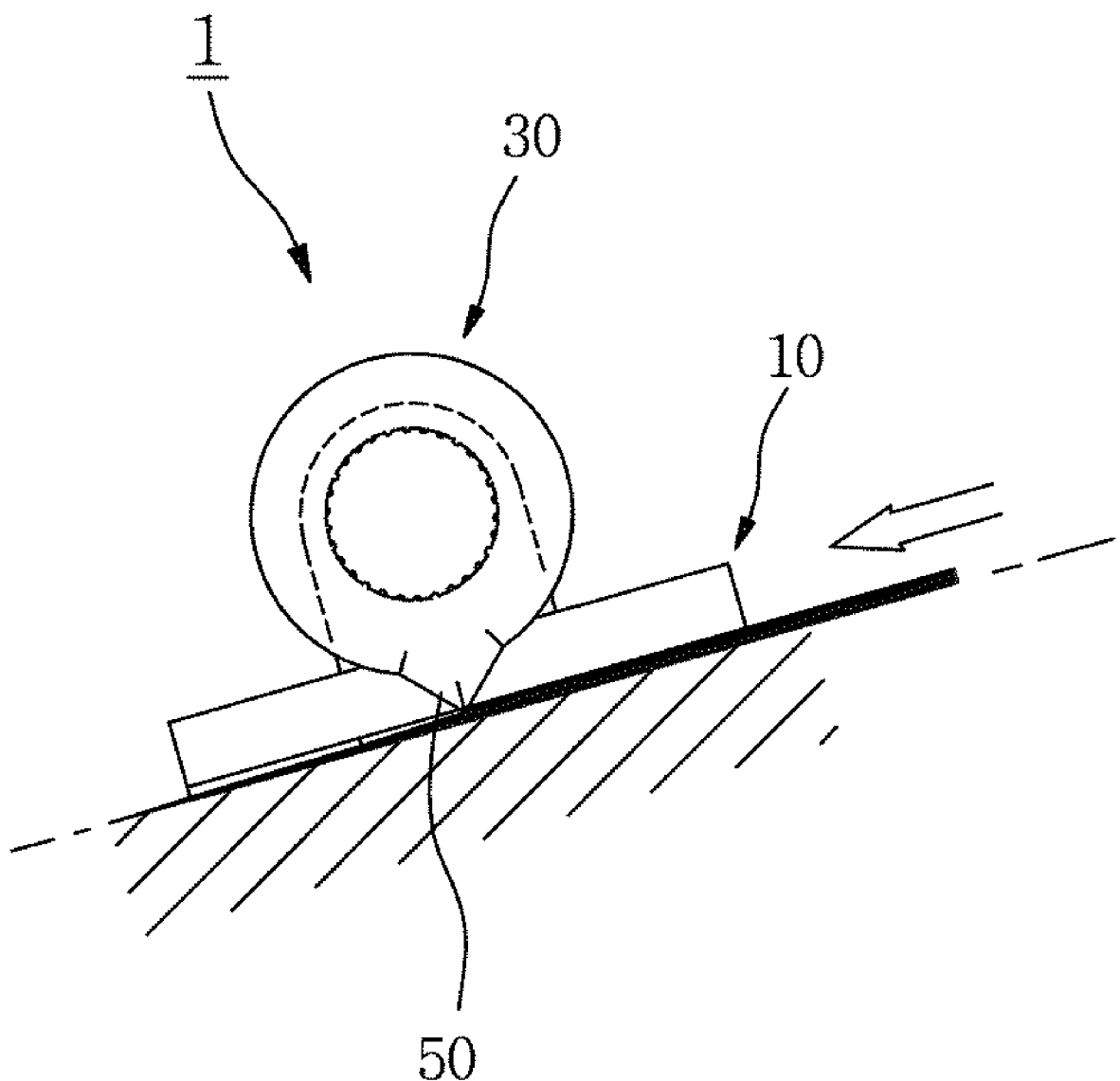

According to the present invention having the structure as described above, the ground may be flat without slope as shown in FIG. 4a, or the ground may have a constant inclination as shown in FIG. 4b, in which the fixing plate 11 equipped with a fixing hole is fixed in close contact with the ground and then the fixing hole 10 is fixed to the ground by passing a bolt or screw through the fixing hole 11a.

When the installation of the fixing connection fixture 10 is completed, the insertion connection fixture 20 is inserted into the through hole having an angle adjustment protrusion 12a formed in the fixing connection fixture 10. Herein, the housing 30 having the substrate 40 installed therein may be coupled to the insertion connection fixture 20. In addition, there is a method of coupling the insertion connection fixture 20 and the housing 30 to the fixing connection fixture 10 in this order, and for convenience, it is preferable that the insertion connection fixture 20 and the housing 30 are first coupled, and then the insertion connection fixture 20 coupled to the housing is installed in the fixing connection fixture 10. The power line is connected to the substrate 40 so that power is supplied, but the structure and description thereof are omitted.

Figure 5:
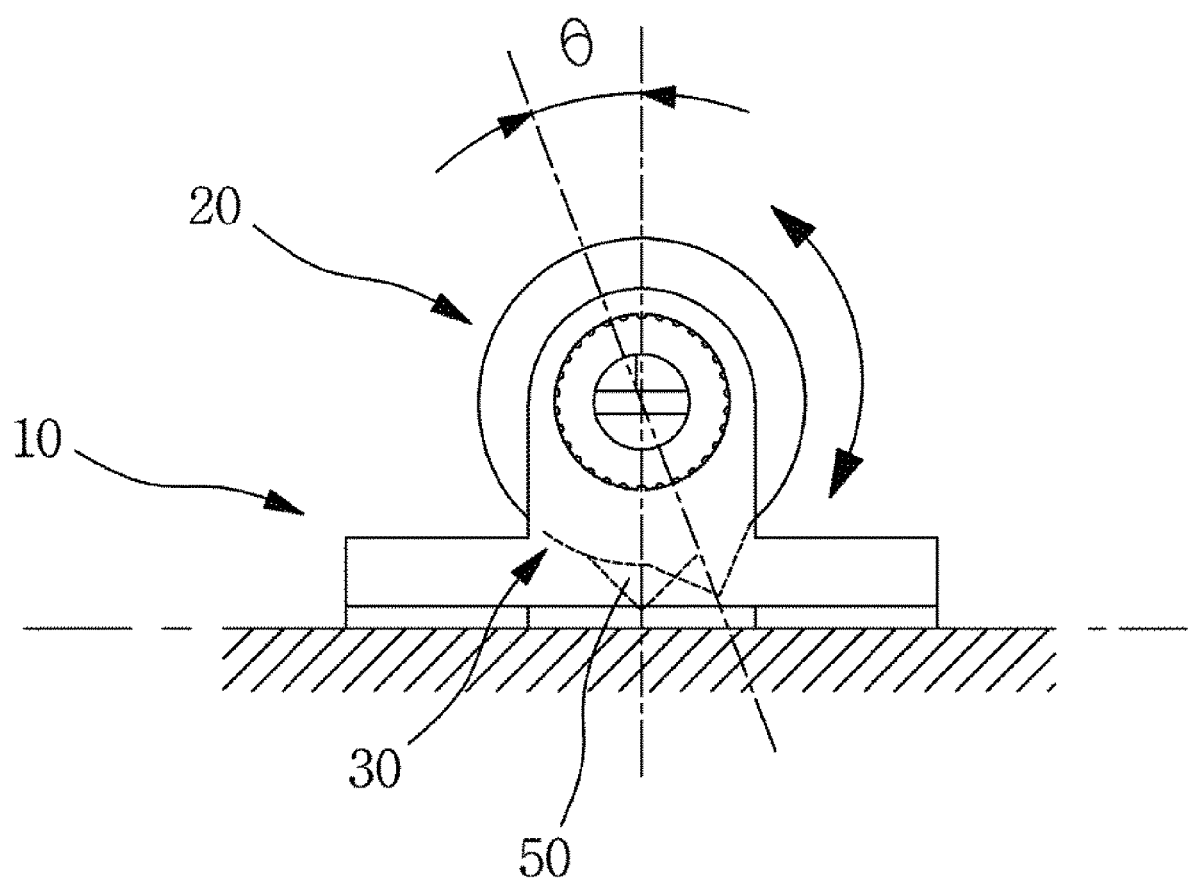
FIG. 5 is an exemplary view illustrating a method of adjusting the position of a liquid leak detection sensor having a sensitivity adjustable function to which the technology of the present invention is applied.

After the liquid leak detection sensor 1 according to the present invention is fixedly installed on the ground as described above, the liquid leak detection sensor 1 may be used as follows. First, the lens part 50 is used to align the vertical center line of the housing 30. Second, when the place in which the sensor of the present invention is installed has an inclination angle as shown in FIG. 4b even in the case that the liquid for which the leak is detected has the same viscosity, the housing 30 is rotated so that the direction of the lens part 50 provided below the housing 30 may be adjusted in the left and right directions within range of a angle θ as shown in FIG. 5, thereby adjusting the sensing sensitivity.

Accordingly, it is possible to adjust the position of the light-emitting unit and the light-receiving unit installed in the housing 30 by rotating the housing 30 according to the inclination of the ground and thus to adjust the sensitivity of the sensing. However, since the speed in which each liquid moves along the ground is different regardless of whether the viscosity of the liquid for which the leak is detected is high or low, the sensing sensitivity may be adjusted according to the viscosity of the liquid for which the leak is detected.

The sensing sensitivity adjustment method is performed by separating the insertion connection fixture 20 inserted into the through hole of the fixing connection fixture 10, rotating the insertion connection fixture 20 to which the housing 30 is coupled in a predetermined direction, and then inserting the insertion connection fixture 20 rotated at a predetermined angle into the through hole of the fixing connection fixture 10.

When the insertion connection fixture 20 is inserted into the through hole of the fixing connection fixture 10, the angle adjustment protrusion 12a formed in the inside of the through hole is fitted into the valleys of the angle adjusting part 21a in which continuous peaks and valleys are formed on the outer surface of the insertion connection fixture 20, thereby preventing rotation thereof.

Of course, the insertion connection fixture 20 may be rotated in the state that the insertion connection fixture 20 is coupled to the through hole of the fixing connection fixture 10, but it is not preferable because a phenomenon occurs in which each angle adjustment protrusion 12a and the angle adjusting part 21a may be worn.

When the switch provided in the controller is operated after the installation of the sensor is completed as described above, the light is emitted through the light-emitting member and at the same time the light is dispersed while causing refraction by the lens part 50, the dispersed light is reflected by the surface of the ground and incident on the light-receiving member, thereby detecting the amount of light.

For example, when the amount of light set by the light-emitting member is 9000 (cd), the amount of light incident on the light-receiving member is 8500-8800 (cd). However, when the leak occurs, the amount of light set by the light-emitting unit member is 9000 (cd), and the amount of light incident on the light-receiving unit member is reduced to 4300-4500 (cd), whereby the leak may be detected.

Herein, there is an effect of enabling a time to sense, that is, the sensitivity of a sensor to be adjusted regardless of whether the viscosity of a leaked liquid is high or low since a sensing position of the sensor can be adjusted according to the viscosity of the leaked liquid, the tilt of an installation place, and the like.

As shown in FIG. 3, the insertion connection fixture 20 is fitted into the through hole of the connection part 12 and is configured so that the cover 22 coupled to the housing 30 is integrated with the insertion part 21 having an angle adjusting part 21a which has continuous peaks and valleys formed on the outer peripheral surface thereof, whereby the locking protrusion 23 in the insertion part 21 is inserted into the locking groove 13 of the fixing connection fixture 10.

The fixing connection fixture and the insertion connection fixture or the insertion connection fixture and the housing coupled as described above may be easily separated from each other by applying an external force since the insertion connection fixture and the housing are made of an elastic body.

DESCRIPTION OF REFERENCE NUMERALS IN DRAWINGS

1: liquid leak detection sensor 10: fixing connection fixture
11: fixing plate 11a: fixing hole
12: connection part 12a: angle adjustment protrusion
13: locking groove 20: insertion connection fixture
21: insertion part 21a: angle adjusting part
22: cover 23: locking protrusion
30: housing 40: substrate
50: lens part

The invention claimed is:

1. A sensor for liquid leak detection, the sensor comprising:
a fixing connection fixture having a fixing plate and a connection block protruding from a top surface of the fixing plate, the connection block having a through hole formed therein;
an insertion connection fixture rotatably coupled to the through hole of the connection block;
a housing coupled to the insertion connection fixture;
a substrate disposed in the housing and configured for receiving and emitting light; and
a lens protruding from the housing,
wherein the housing has a cylindrical shape extending from a rear side of the insertion connection fixture along a rotational axis of the insertion connection fixture, and the lens protrudes from an outer surface of the housing in a direction perpendicular to the rotational axis of the insertion connection fixture.

2. The sensor of claim 1, wherein the insertion connection fixture is includes an insertion shaft configured to be inserted into the through hole of the connection block, the insertion shaft having peaks and valleys regularly formed on an outer peripheral surface thereof.

3. The sensor of claim 1, wherein the connection block includes at least one angle adjustment protrusion protruded from an inner circumferential surface of the through hole of the connection block.

4. The sensor of claim 1, wherein the connection block includes a locking groove formed on an inner circumferential surface of the through hole of the connection block, and the insertion connection fixture includes a locking protrusion formed on an outer peripheral surface thereof, such that the locking protrusion is fitted into the locking groove to prevent the insertion connection fixture from being separated from the connection block.

* * * * *